United States Patent [19]

McCullough

[11] Patent Number: 5,837,626
[45] Date of Patent: Nov. 17, 1998

[54] IGNITION RESISTANT OR FIRE BLOCKING COMPOSITE

[76] Inventor: Francis Patrick McCullough, 104 Fir Dr., Lake Jackson, Tex. 77566

[21] Appl. No.: 903,696

[22] Filed: Jul. 31, 1997

Related U.S. Application Data

[62] Division of Ser. No. 428,691, Apr. 25, 1995, Pat. No. 5,700,573.

[51] Int. Cl.⁶ ....................................... D02G 3/00
[52] U.S. Cl. ........................... 442/353; 442/361; 428/370
[58] Field of Search ..................................... 442/353, 364, 442/361; 428/370

[56] References Cited

U.S. PATENT DOCUMENTS

| | | | |
|---|---|---|---|
| 4,837,076 | 6/1989 | McCullough et al. | 428/224 |
| 4,868,037 | 9/1989 | McCullough et al. | 428/222 |
| 4,879,168 | 11/1989 | McCullough et al. | 428/224 |
| 4,897,303 | 1/1990 | McCullough et al. | 428/224 |
| 4,898,783 | 2/1990 | McCullough et al. | 423/441.2 |
| 4,980,233 | 12/1990 | McCullough et al. | 428/411.1 |
| 4,997,716 | 3/1991 | McCullough et al. | 428/411.1 |
| 5,700,573 | 12/1997 | McCullough et al. | 428/370 |

*Primary Examiner*—Newton Edwards
*Attorney, Agent, or Firm*—Nis H. Juhl

[57] ABSTRACT

A novel ignition resistant or fire blocking composite is disclosed comprising a multiplicity of biregional fibers with a thermoplastic or thermoset polymer, wherein each said biregional fiber comprises an inner region of a thermoplastic polymeric core and an outer region of a carbonaceous sheath, and wherein said biregional fibers are present in the composite in an amount of from 10 to 95% by weight, based on the total weight of the composite. In one embodiment, the multiplicity of biregional fibers are treated with up to 20% of a polymerizable silicone resin. In a further embodiment the thermoplastic or thermoset polymer is in the form of a sheet or panel and said multiplicity of biregional fibers are distributed throughout the polymeric matrix of the sheet or panel in an amount of from about 20 to 75%.

6 Claims, No Drawings

IGNITION RESISTANT OR FIRE BLOCKING COMPOSITE

CROSS REFERENCE TO RELATED APPLICATIONS

This application is a divisional of my copending application Ser. No. 08/428,691, filed Apr. 25, 1995, now U.S. 5,700,573 entitled Flexible Biregional Carbonaceous Fiber, Articles Made from Flexible Biregional Carbonaceous Fibers, and Method of Manufacture.

FIELD OF THE INVENTION

The present invention relates to a flexible, biregional, carbonaceous fiber derived from a biregional stabilized precursor fiber, said carbonaceous fiber having an inner region of a thermoplastic polymeric core and an outer region of a carbonaceous sheath. The invention also relates to a method for the manufacture of the biregional stabilized precursor and carbonaceous fibers, and to articles made from a multiplicity of said biregional carbonaceous fibers.

In both of the biregional precursor fiber and the carbonaceous fiber, the ratio (r:R) of the radius of the core region (r) with respect to the total radius R of the biregional fiber is from about 1:4 to about 1:1.05, preferably from about 1:3 to about 1:1.12. Preferably, the precursor fiber of the invention has a density of from about 1.20 g/cm$^3$ to about 1.32 g/cm$^3$. The biregional carbonaceous fiber of the invention lacks the brittleness normally associated with carbon and graphitic fibers of the prior art and preferably has a density ranging from about 1.45 to 1.85 g/cm$^3$ and as high as 1.87 g/cm$^3$ for biregional graphitic fibers, a bending strain value of from greater than about 0.01 to less than 50%, preferably from about 0.1 to about 30%, and a Young's modulus of from less than 1 MM psi (<6.9 GPa) to 50 MM psi (345 Gpa), preferably from about 1 MM psi to about 30 MM psi.

BACKGROUND OF THE INVENTION

Resilient and flexible, linear and non-linear carbonaceous fibers are now well known in the art. Representative of non-linear carbonaceous fibers is U.S. Pat. No. 4,837,076, issued Jun. 6, 1989 to McCullough et al, the subject matter of which is incorporated herein by reference. The fibers are produced by melt or wet spinning polymeric fibers having a diameter of from about 4 to about 30 micrometers and then stabilizing the fibers by treating them in an oxygen containing atmosphere and at an elevated temperature for a predetermined period of oxygen containing atmosphere and at an elevated temperature for a predetermined period of time. The oxidation stabilization treatment of the fibers is carried out to the extent such that the entire polymeric material of the fibers, when viewed in cross-section, is oxidized. Although the stabilization process, to some extend, depends on the diameter of the fibers, the composition of the polymeric precursor material, the level of oxygen in the atmosphere, and the treatment temperature, the process is extremely time consuming and costly in order to achieve complete stabilization of the fibers throughout their cross section.

These conventionally stabilized fibers (stabilized precursor fibers) are subsequently formed into a coil-like and/or sinusoidal shape by knitting a fiber tow into a fabric or cloth. The so formed knitted fabric is thereafter heat treated in a relaxed and unstressed condition and in a non-oxidizing atmosphere at a temperature of from about 525° C. to about 750° C. and for a period of time sufficient to produce a heat induced thermoset reaction wherein additional crosslinking and/or cross chain cyclization occurs between the original polymer chains. In example 1 of the patent, it is reported that portions of a stabilized knitted cloth were heat set at temperatures ranging from 550° to 950° C. over a 6 hour period. The most flexible fibers and fibers that are subject to the least fiber breakage due to brittleness when subjected to textile processing were obtained in those fibers that had been heat treated at a temperature of from about 525° C. to about 750° C. . The resulting fiber tows, obtained by deknitting the cloth, and having the heat set, non-linear structural configuration, can then be subjected to other methods of treatment known in the art to create an opening, a procedure in which a yarn or the tow of the fibers of the cloth are separated into an entangled, wool-like fluffy material, in which the individual fibers retain their coil-like or sinusoidal configuration, yielding a fluff or batting-like body of considerable loft.

The patent also discloses that at a treatment temperature above 1000° C. the stabilized precursor fibers become highly electrically conductive where they begin to approach the conductivity of a metallic conductor and that these fibers find special utility in the manufacture of electrodes for energy storage devices. Carbonization of the stabilized fibers is carried out at a temperature and for a period of time sufficient such that the entire stabilized polymeric material of the fiber, when viewed in cross-section, is carbonized. Accordingly, the carbonization process, especially at the higher temperatures, is extremely time and energy consuming and equipment intensive, and therefor costly.

Traditionally, the stabilization treatment of polymeric fibers under oxygen extends over at least several hours to in excess of 24 hours to completely permeate the fibers with oxygen and to achieve sufficient stabilization of the fibers in preparation for subsequent carbonization of the stabilized fibers to produce carbonaceous fibers for commercial end uses (see High Performance Fibers II, published by Battelle, Copyright 1987, esp. the chapter entitled "Process Technology—Oxidation/Stabilization", pp. Carbon 149 et seq.). Such lengthy stabilization treatment reduces the productive output of fibers, requires substantial capital investment, and is therefor costly and a major deterrent in rendering the process desirable for greater commercial exploitation, i.e. extended usage at lower cost. It is also taught that if electrically heated oxidation chambers are used, the chambers must be substantially larger than the ovens used in a subsequent carbonization step.

Where graphitization of the stabilized fibers is desired in order to produce high tensile modulus properties, the fibers are treated at temperatures of from 2000° to 3000° C. Here again, it is also reported that "breakage of the fibers is a problem that has not been solved" and that "the most serious disadvantage of these high tensile strength fibers is their low strain-to-failure ratio, which means that they are very brittle". Moreover, the process is also said to be expensive because of the "high capital cost of the equipment and the great amount of electrical energy required to achieve the necessary temperature." (pp.—158 and 159 of the above referenced Battelle publication).

Fibers that are generally referred to as "biconstituent", "bilateral and composite", and "sheath-core" fibers are commonly known in the art. Definitions of these terms can be found in "Man-Made Fiber and Textile Dictionary", Celanese Corporation, pp. 17, 33 and 123. A biconstituent fiber is defined as a fiber that is extruded from a homogeneous mixture of two different polymers wherein such fibers combine the characteristics of the two polymers into a single fiber. Bilateral and composite fibers are generally defined as fibers that are composed of two or more polymer types in a sheath-core or side by side (bilateral) relationship. Sheath-core fibers are bicomponent fibers of either two polymer types or two variants of the same polymer. One polymer forms a core and the other surrounds it as a sheath.

The Encyclopedia of Polymer Science and Engineering, Vol. 2, A Wiley-Interscience Publication, 1985, pp. 641–659, reports that "current standard processing technology requires 1–2 h for adequate stabilization" of fibers, p.658. No other method of processing suitable for large or "heavy" 320 k tows is disclosed.

Bicomponent fibers have also been generally disclosed in U.S. Pat. No. 4,643,931, issued Feb. 17, 1987 to F. P. McCullough et al. These fibers are blends of a small amount of conductive fibers into a yarn to act as an electrostatic dissipation element. Fiber manufacturers also routinely manufacture conductive fibers by incorporating into a hollow fiber a core of carbon or graphite containing thermoplastic composite or by coating a fiber with a sheath made of a thermoplastic composite containing carbon or graphite.

The biregional fiber of the invention distinguishes over the various types of fibers of the prior art in that the biregional fiber is produced from a homogenous polymeric material, i.e. of the same composition, in which an outer fiber portion of the polymeric material is oxidation stabilized and then carbonized to form two distinct regions in the fiber, when viewed in cross section, comprising a thermoplastic inner core and a thermoset or carbonized outer sheath. Preferably, the homogenous polymeric material is a standard acrylic polymer, i.e. copolymers and terpolymers of acrylonitrile, wherein the copolymers and terpolymers contain at least 85 mole percent acrylic units and up to 15 mole percent of one or more vinyl monomers copolymerized therewith, or optionally, a subacrylic polymer as hereinafter defined.

DEFINITIONS

The term "biregional carbonaceous fiber" used herein generally refers to a fiber that is produced from a homogenous polymeric material, i.e. of the same composition. The fiber is composed of two visually distinguishable regions when viewed in cross section and comprises an inner core of a thermoplastic polymeric material which is surrounded by a carbonaceous outer sheath. The inner core and the outer sheath are substantially distinct from each other and clearly defined and do not present, to any extent, an intermediate zone between the inner core and the outer sheath.

The term "biregional fiber" or "biregional fibers" used herein is generally applicable to both of the biregional precursor fiber and the biregional carbonaceous fiber.

The terms "precursor fiber"; "stabilized fiber"; "biregional precursor fiber", or "stabilized precursor fiber" used herein all apply to a flexible biregional fiber, derived from a homogeneous polymeric composition, or a heterogeneous mixture comprising the homogeneous polymeric composition having submicron particles, or the like, distributed throughout the composition. The biregional precursor fiber has an inner region of a thermoplastic polymeric core and an outer region of an oxidatively stabilized, thermoset polymeric sheath. The fiber becomes, in effect, a "precursor" fiber for preparation of the biregional carbonaceous fiber of the invention.

The term "thermoset" used herein applies to polymeric materials that have undergone a heat induced crosslinking reaction of the molecular constituents to irreversibly "set" the polymer. Oxidation and cyclization of the polymeric material generally takes place at a temperature of between 150° to 350° C.

The term "carbonization" used herein applies to the carbonization of the stabilized region of the precursor fiber of the invention which is carried out in an inert atmosphere and at an elevated temperature in which the existing carbon-to-carbon bonds are maintained and new carbon-to-carbon linkages are established while eliminating oxygen, hydrogen and nitrogen from the molecular structure of the fiber region and without causing a complete carbonization throughout the cross-section of the fiber. Depending on the particular end use desired, the outer sheath region of the fiber can be carbonized to greater than 68% and up to graphitization where the carbon content exceeds 98%.

The term "Carbon fiber" is known and generally applies to a fiber having a uniform carbon content throughout a cross section of the fiber of greater than 92%, while the term "Graphite" or "graphitic" is generally applied to a fiber having a uniform carbon content throughout a cross section of the fiber of greater than 98%. It is intended herein that the term "carbonaceous" applies to the outer sheath region of the biregional fiber of the invention which has been carbonized to a carbon content of greater than 68% by weight.

The term "flexible" used herein is specifically applicable to the biregional fibers of the invention having a bending strain value of from greater than about 0.01 to less than 50%, preferably from about 0.1 to 30%.

The term "bending strain" as used herein is as defined in Physical Properties of Textile Fibers by W. E. Morton and J. W. S. Hearle. The Textile Institute, Manchester, pages 407–409. The percent bending strain on a fiber can be determined by the equation $S=(r/R)\times 100$ where S is the percent bending strain, r is the effective cross sectional fiber radius and R is the radius of curvature of the bend. That is, if the neutral plane remains in the center of the fiber, the maximum percentage tensile strain, which will be positive on the outside and negative on the inside of the bend, equals $(r/R)\times 100$ in a circular cross section of the fiber.

The term "shear sensitivity" used herein generally applies to the tendency of a fiber to become fractured along a plane in the cross section of a fiber as a result of forces acting parallel to the plane. In practical terms, when fibers are subjected to certain textile operations such as the drafting operation in a yarn blending process, the drafting rollers exert significant shear on the fibers being drafted. Shear sensitive fibers exhibit extensive damage, if not complete breakage, whereas shear resistant fibers do not exhibit any significant breakage in this process step.

Conversely, the term "shear resistant" is applied to fibers which do not tend to break significantly when exposed to textile process operations such as drafting which exert significant shear stresses on the fibers being processed.

The term "bulk resistivity" used herein generally applies to the effective resistivity of a biregional fiber taking into account the specific resistivity of the composition of each region and the proportion of area represented by each region, i.e., the particular ratio (r:R) as it applies to a fiber with predetermined selected properties.

The term "polymeric" fibers used herein include those materials as defined in Hawley's Condensed Chemical Dictionary, Eleventh Edition, page 938.

The term "crimp" as used herein applies to the waviness or nonlinearity of a fiber or fiber tow, as defined in "Man Made Fiber and Textile Dictionary" by Celanese Corporation.

The term "Reversible Deflection Ratio" (RDR) as used herein generally applies to a crimped fiber that has a physical characteristic comparable to that of a compression spring. Particular reference is made to the Publication "Mechanical Design—Theory and Practice", McMillan Publ. Co., 1975, pp. 719 to 748, particularly Section 14-2, pp. 721 to 724. The RDR generally is greater than 1:1. It can be somewhat less than 1.2:1 for fibers that have standard textile crimps, or greater than 1.2:1 for fibers made non-linear by a chain crimper or a knit/deknit process and depends entirely on the manner in which the fiber is crimped. In a gear crimper, for example, the teeth of the gears can be spaced very closely together or at a great distance from each other to provide the fibers with the desired RDR. It will be understood that the diameter of the fibers determines to some extent how closely the teeth of the gears can be spaced from each other.

The term "Fiber Assembly" used herein applies to a multiplicity of fibers that are in the form of a yarn, a wool like fluff, batt, mat, web or felt, a compression formed sheet, screen or panel, a knitted or woven cloth or fabric, or the like.

The term "Cohesion" or "Cohesiveness" used herein, applies to the force which holds fibers together, especially during yarn manufacture. It is a function of the type and amount of lubricant used and the fiber crimp.

The term "aspect ratio" is defined herein as the length to diameter (l/d) ratio of a fiber.

All percentages given herein are in "percent by weight" unless otherwise specified.

SUMMARY OF THE INVENTION

The present invention comprises a major departure from the present state of the art in that it is now no longer necessary to completely oxidatively stabilize polymeric fibers throughout their cross section, but that such fibers can now be made into biregional oxidatively stabilized precursor fibers by limiting the extent of stabilization to an outer region of the fibers such that the length of time that is required to stabilize the fibers is substantially reduced, resulting in a substantial reduction in the cost of manufacture of the stabilized fibers.

Correspondingly, in the process of the invention, it is now no longer necessary to completely carbonize the stabilized precursor fibers but that the time of carbonization can be reduced by carbonizing only that portion of each fiber which has been oxidatively stabilized, thereby reducing the time and energy requirements for the manufacture of the carbonized biregional fiber of the invention while improving key performance characteristics of the fiber, particularly its flexibility, elongatability, and shear sensitivity.

It is therefor a particular object of the invention to provide a flexible biregional carbonaceous fiber comprising an inner region of a thermoplastic polymeric core material and an outer region of a carbonaceous sheath.

It is another object of the invention to provide a flexible biregional precursor fiber comprising an inner region of a thermoplastic polymeric core material and an outer region of an oxidatively stabilized sheath.

It is another object of the invention to provide a process for the manufacture of a biregional oxidation stabilized precursor fiber of the invention from a thermoplastic polymeric fiber by treating the polymeric fiber in an oxidizing atmosphere and for a period of time and at a temperature sufficient to oxidize an outer region of the fiber to form an oxidation stabilized, thermoset, outer sheath, said fiber having an inner core region consisting of a non-oxidized thermoplastic material.

It is another object of the invention to provide a process for the manufacture of a biregional carbonaceous fiber of the invention from a thermoplastic polymeric material by treating the polymeric fiber in an oxidizing atmosphere for a period of time and at a temperature sufficient to oxidize an outer region of the fiber to form an oxidation stabilized outer sheath, and then heating the fiber in a non-oxidizing atmosphere at a temperature and for a period of time sufficient to carbonize the outer oxidation stabilized sheath of the fiber, said fiber having an inner region of a non-oxidized thermoplastic core and an outer region consisting of a carbonaceous sheath.

It is a further object of the invention to provide various assemblies from a multiplicity of the novel biregional carbonaceous fibers of the invention, including tows, nonwoven assemblies made from a multiplicity of biregional fibers such as, for example, a wool like fluff, batt, web, felt, and the like, a compression formed or densified sheet of panel, or a knitted or woven fabric, and the like. In any of these assemblies, the fibers can be linear or crimped or a mixture thereof.

It is also an object of the invention to provide a multiplicity of the biregional non-linear carbonaceous fibers of the invention in the form of a wool like fluff or batting for use as a flame resistant thermal insulation for buildings, such as residential, office, or public buildings. Depending on the degree of carbonization, i.e. electrically non-conductive, semi-conductive, or conductive, the fibers can also be used for various other purposes such as an antistat or electromagnetic shielding material; as a sound absorbing material in aircraft, or as a fire blocking panel in vehicles such as automobiles, aircraft, ships, etc. Fibers that are graphitized and highly electrically conductive are useable for electrodes in secondary energy storage devices.

It is another object of the present invention to blend the biregional non-linear carbonaceous fibers of the invention with other natural or polymeric fibers. These fibers are particularly useful in the preparation of yarn for the manufacture of textiles. Other blends are useful in the form of a wool like fluff that can be used in clothing articles such as, for example, jackets, blankets or sleeping bags.

In another object of the invention, the biregional carbonaceous fibers of the invention can be employed as a reinforcement material in a polymeric matrix, forming a composite. The biregional fibers can be linear, non-linear, or mixtures of the linear and non-linear fibers and can be applied to at least one surface of the polymer or throughout the polymer. When the fibers are applied to the surface of a polymeric panel such as, for example, a panel formed from a polystyrene polymer, as little as about 10% by weight of the fibers, based on the total weight of the panel, provide the panel with fire resistance. When the fibers are distributed throughout the polymer, in an amount of up to 95% by weight, the fibers provide a composite having improved fire resistance, vibration and impact resistance and adhesion.

It is a particular object of the invention to provide terminal and/or bipolar electrodes for secondary storage devices, such as batteries, including lithium ion cells, employing the novel biregional graphitic fibers of the invention.

It is a further aspect of the invention, to provide the biregional carbonaceous fiber of the invention with a conformal silicone coating in order to enhance the fire resistant characteristics of the fiber.

It is also an aspect of the invention, to provide an assembly from a multiplicity of the biregional carbonaceous fiber of the invention and to coat the assembly with a hydrophobic material coating in order to render the assembly buoyant.

It is a further object of the invention to employ a multiplicity of the biregional carbonaceous fibers of the invention in the form of a batting, webbing, or the like, as an electromagnetic shielding material. Optionally, the shielding material can be incorporated into a polymeric matrix to form a panel.

Further objects of the invention, not specifically recited herein above, will become apparent from a reading of the detailed description of the invention.

BRIEF DESCRIPTION OF THE DRAWINGS

FIG. 1 is across sectional view of a generally circular in cross section, biregional carbonaceous fiber of the invention.

FIG. 2 is a cross sectional view of a preferred trilobal in cross section, biregional carbonaceous fiber of the invention.

FIG. 3 is a schematic view of a flow chart of the process steps for the manufacture of the biregional fibers of the invention and various end uses for the novel biregional fiber.

DETAILED DESCRIPTION OF THE INVENTION

In the manufacture of carbonaceous fibers, stabilization of polymeric fibers is generally conducted in an oxidizing atmosphere and under tension at a moderately elevated temperature of, typically, from about 150° C. up to about 350° C. for PAN (polyacrylonitrile) fibers and for a period of time sufficient to achieve complete permeation of oxygen throughout the fiber, and then heat treating the oxidized fiber (OPF) in a non-oxidizing atmosphere, usually under tension, at a temperature above about 750° C. to produce a fiber that is carbonized throughout a cross section of the fiber. Fibers that are treated at a temperature above about 1500° C. typically have a carbon content of greater than 92% and are characterized as carbon or graphitic fibers having a high tensile strength. Stabilization of the fibers involves (1) an oxidation cross-linking reaction of adjoining molecular chains as well as (2) a cyclization reaction of pendant nitrate groups to a condensed heterocyclic structure. The reaction mechanism is complex and not readily explainable. It is believed, however, that these two reactions occur concurrently and may be competing. The cyclization reaction is exothermic in nature and must be controlled if the fibrous nature of the acrylic polymer undergoing stabilization is to be preserved.

Because the reactions are highly exothermic in nature, the total amount of heat released is so great that temperature control is difficult. Care must be taken to avoid processing too large a number of fibers in close proximity, which would cause localized heat buildup and impede heat transfer to the atmosphere around the fibers in the fiber assembly (e.g. a fiber tow or a woven or knitted cloth). In fact, the oxidation stabilization of acrylic fibers has a considerable potential for a runaway reaction. Furthermore, some trace of hydrogen cyanide is evolved during this step and the content of this component in the atmosphere of the oven must be prevented from getting into the explosive range by injecting nitrogen, as required. Accordingly, prior art techniques overcome this problem by heating the fibers at a moderate temperature and at a controlled oxygen content over many hours. Control of the oxygen containing atmosphere, e.g. air, can be achieved by diluting the air with nitrogen.

Since thermal stabilization has tended to be unduly time consuming and capital intensive, various other approaches have also been proposed to expedite the desired reaction, e.g., through the use of stabilization promoting agents and/or chemical modification of the acrylic fiber before it can be pyrolized. However, these approaches have also added to the cost of manufacture and further lengthened the time of processing the fibers.

It has now been discovered that the extent of oxidation stabilization of an acrylic fiber can be substantially reduced by oxidizing only an outer portion or region (when viewed in cross section) of the fiber while the inner portion or core of the fiber remains in a thermoplastic and non-stabilized condition. Achieving stabilization of only an outer region of a fiber can therefor be conducted over a much shorter period of time, depending on the extent of oxygen penetration into the fiber and the desired thickness of the stabilized outer fiber sheath. Typically, the ratio of the radius of the core with respect to the total radius of the fiber is from about 1:4 to about 1:1.05, preferably from about 1:3 to about 1:1.12, and depends entirely upon the desired physical characteristics and intended use for the fiber. At a ratio of 1:4, it can be calculated that the percentage volume that is represented by the core is about 6% by volume, leaving about 94% for the outer sheath. At a ratio of 1:1.05 the percentage volume that is represented by the core is about 91%, leaving about 9% for the outer sheath. It is generally preferred to keep the ratio at a value where the volume of the outer sheath is relatively small, preferably less than 25%, which represents a ratio of about 1:1.12 to less than 1:1.15 in order to keep the time of oxidation or carbonization treatment at a minimum.

It will be understood that the ratio can be adjusted to any value, depending upon the end use or physical characteristics desired for the biregional carbonaceous fiber of the invention. For example, a ratio of 1:1.12 to 1.16 would be entirely satisfactory for use of a multiplicity of the biregional carbonaceous fibers as thermal insulation for building structures, while a ratio of 1:2 to as high as 1:3 would be sufficient for graphitized biregional fibers when used as an electrode material for secondary electrical storage devices.

The oxidatively stabilized fibers are heat treated in an inert atmosphere and for a period of time sufficient to form an outer region of a carbonaceous sheath which, preferably, is of substantially the same thickness as the stabilized outer sheath of the fiber. It will be understood, however, that the processing conditions are difficult to control and maintain to an absolute exact degree such that there is a precise coincidence of carbonization of the oxidation stabilized region only of the fiber. It has now been discovered that this is not critical and that an exact coincidence of the regions is not absolutely essential. In other words, the oxidation stabilized region can be carbonized to the extent that carbonization extends into the thermoplastic core region, without detriment to the fibers.

It has also been surprisingly discovered that the oxidation stabilization of polymeric fibers can be controlled, i.e. stopped at any point, to produce two distinct regions and that these fibers are capable of surviving the subsequent carbonization treatment. It is presently the believe that oxidation stabilization has to be carried out to the extent that the entire fiber material is sufficiently oxidized to stabilize the fiber for subsequent carbonization of the fibers since a partially oxidized fiber is believed to be highly reactive at temperatures above 200° C. The expectation by persons skilled in the arts is that carbonaceous fibers can not be produced without a complete stabilization of the fibers prior to their treatment at a higher temperature and in a non-oxidizing atmosphere to achieve carbonization. It is therefor surprising that stabilization and, correspondingly, carbonization of the fibers need not be complete and that such partial treatment can be carried out without any detriment to the carrying out of the process per se or to the overall performance of the resulting fibers for their intended purpose.

The following Table demonstrates the physical characteristics for various types of fibers including the biregional fibers of the invention:

TABLE I

| Material* | ρ (g/cc)  | SR (Ohm-cm)      | YM (psi) | Elong. (%) | Strength | TP/TS | Shear Sen. |
|-----------|-----------|------------------|----------|------------|----------|-------|------------|
| PAN/SAF   | 1.15–1.19 | $>10^8$          | low      | 8–10       | low      | tp    | ns         |
| OPF       | 1.33–1.44 | $>10^8$          | low      | 20–30      | low      | tp–ts | ns         |
| BROF      | 1.20–1.32 | $>10^8$          | low      | 15–25      | low      | tp–ts | ns         |
| CDF 1     | 1.50–1.60 | $10^8$–$10^2$    | 1 MM     | 3–9        | low      | ts    | ss         |
| CDF 2     | 1.60–1.70 | $10^2$–$10^{-1}$ | 2–3 MM   | 3–6        | medium   | ts    | vss        |
| CDF 3     | 1.70–1.95 | $<10^{-1}$       | 3–20 MM  | 2–4%       | medium   | ts    | ess        |
| BRCF 1    | 1.45–1.60 | $10^8$–$10^2$    | <1 MM    | 4–12       | low      | ts    | ns         |
| BRCF 2    | 1.50–1.70 | $10^3$–$10^0$    | 1–2 MM   | 3–9        | low      | ts    | slight ss  |
| BRCF 3    | 1.65–1.85 | $<10^0$          | 2–18 MM  | 3–7%       | medium   | ts    | slight ss  |
| BRGF      | 1.70–1.87 | $<10^{-2}$       | 3–30 MM  | 2–5%       | high     | ts    | ss         |

Legend
PAN/SAF - Polycrylonitrile/Special Acrylic Fiber
OPF - Oxid. Pan Fiber
BROF - Biregional Oxidized Fiber
CDF - Carbonized PAN Fiber
CDF 1 - noncond.
CDF 2 - antistat
CDF 3 - conductive
BRCF - Biregional Carbonaceous Fiber
BRGF - Biregional Graphitized Fiber
Shear Sensitivity
ns non sensitive
ss sensitive
vss very sensitive brittle
ess extr. sensitive v. brittle
*All BR fibers can be linear or crimped
TP/TS - Thermoplastic/Thermoset Char.
YM = Young's Modulus From the Table, it can be concluded, for example, that the biregional carbonaceous fibers of the invention can be broadly classified into three groups depending upon their particular use and the environment in which they are placed.

In a first group, the biregional precursor fiber can be carbonized to an extent where the carbonaceous outer sheath of the fiber is partially carbonized and has a carbon content of greater than 68% but less than 85% by weight, is electrically non-conductive and does not possess any electrostatic dissipating characteristics. A fibrous assembly made from a multiplicity of such fibers is light weight, non-flammable, and has excellent washability and can be used in, for example, personal clothing articles such as jackets, blankets, sleeping bags, or the like. The biregional carbonaceous fibers can also be made into a batting or webbing, for example, that can be blended with other synthetic or natural fibers including cotton, wool, polyester, polyolefin, nylon, rayon, etc. Blended fibers or yarn are non-flammable and are excellent for use in fabrics, carpeting, etc.

The term electrically non-conductive as utilized in the present invention relates to a fiber in which the outer carbonaceous sheath has a bulk resistivity of from about $10^2$ to $10^8$ ohm-cm. When the biregional carbonized fiber is derived from an acrylic fiber it has been found that a nitrogen content of the carbonaceous outer sheath of about 22% by weight or higher results in an electrically non-conductive, biregional fiber. Biregional fibers of this group typically have a density of from about 1.45 to 1.60 g/cm³, a Young's modulus of less than 1 MM psi, and an elongatability to break of from about 4% to about 12%. The fiber is not measurably shear sensitivity and can be readily processed on standard textile equipment including shear intensive processing operations such as drafting operations.

In a second group, the biregional fiber of the invention can be carbonized to an extent where the outer carbonaceous sheath of the fiber has some electrical conductivity, i.e. the fiber is partially electrically conductive and has electrostatic dissipating characteristics. The carbonaceous outer sheath has a carbon content of greater than 68% but less than about 85% by weight. Low conductivity means that carbonaceous sheath of the fiber has a bulk resistivity of from about $10^3$ to $10^0$ ohm-cm. When these biregional fibers are derived from stabilized acrylic precursor fibers, they possesses a percentage nitrogen content of from about 16 to about 22%, preferably from about 16 to about 18.8% by weight. Fibers of this group typically have a density of from about 1.50 to 1.65 g/cm³, a Young's modulus of from about 1 to about 2 MM psi, and an elongatability to break of from about 3% to about 9%. This biregional fiber has a slight sensitivity to shear but compares favorably with fibers that are fully carbonized and that are typically very shear sensitive.

A fibrous assembly made from a multiplicity of the biregional fibers of the second group is non-flammable and is excellent for use as insulation for aerospace vehicles as well as insulation in areas where public safety is a concern. The assembly formed from these biregional fiber is lightweight, has low moisture absorbency, good abrasive strength together with good appearance and handle.

In a third group the fiber are carbonized to an extent where the carbonaceous outer sheath of the fiber is electrically conductive and has a carbon content of at least 85% but less than 92% by weight and a nitrogen content of greater than 5% by weight. These biregional fibers are characterized as having a high electrical conductivity, that is, the fibers have a bulk resistivity of less than about 100 ohm-cm. Fibers of this group typically have a density of from about 1.65 to 1.85 g/cm³, a Young's modulus of from about 2 to about 18 MM psi, and an elongatability to break of from about 3% to about 7%. The fiber has a slight shear sensitivity which compares favorably with fully carbonized fibers which typically are extremely shear sensitive, i.e. fiber CDF 3.

A batting made from a multiplicity of such fibers, as a result of their higher carbon content, has superior thermal insulating and sound absorbing characteristics. Such a batting also has good compressibility and resiliency while maintaining improved thermal insulating efficiency. The batting finds particular utility in the insulation of furnaces and areas of high heat and noise.

In a fourth group, the fiber can be carbonized to an extent where the carbonaceous outer sheath of the fiber is highly electrically conductive and has a carbon content of greater than 92% to as high as 99% by weight. Broad categories of the conventional fibers falling into this group are disclosed in "Encyclopedia", in supra, p.641, and are generally defined as "high strength" and "high modulus" fibers in which the treatment temperatures range from 1200° to 2500° C. Biregional carbonaceous fibers of the invention having a carbon content of greater than 92% are characterized as having a bulk resistivity of less than about $10^{-2}$ ohm-cm. Fibers of this group typically have a density of from about 1.70 to 1.87 g/cm$^3$, a Young's modulus of generally from about 3 to 30 MM psi but can be as high as 50 MM psi, depending upon the degree of carbonization, i.e. carbon content and thickness of the outer graphitic region. These fibers have an elongatability to break of from about 2% to about 5% and are somewhat shear sensitive although they still compare very favorably with conventional carbon or graphite fibers which typically are extremely shear sensitive. The fibers are particularly suitable for use in electrodes for secondary storage devices, esp. batteries.

It will be understood that the Young's modulus for any of the above described biregional fibers can be somewhat higher than indicated since the Young's modulus is, to a great extent, dependent on the degree of carbonization of the outer sheath and the extent of carbonization of the fiber per se, i.e. the thickness of the carbonized region of the fibers.

Polymeric materials that can be suitably used herein to make the biregional fibers of the invention include any of the well known polymers that are capable of being stabilized and carbonized to form the flexible biregional fibers of the invention. Exemplifications of such polymeric materials are copolymers and terpolymers of polyacetylene, polyphenylene, polyvinylidene chloride, and polyacrylonitrile. Other well known polymeric materials include aromatic polyamides (KEVLAR™), polybenzimide resin, SARAN™, and the like. Mesophase pitch (petroleum or coal tar) containing particulate impurities or additives can also suitably be employed. Preferably, the polymeric precursor material of the invention is an acrylic or a sub-acrylic polymer (as hereinafter defined).

It is known in the art and an accepted standard, imposed by the Federal Trade Commission, that the term "acrylic" applies to any long chain synthetic polymers composed of at least 85 mole percent by weight of acrylonitrile units and less than 15 mole percent of another polymer. Fibers made from these acrylic materials are generally wet spun and are limited to fibers having a circular cross-section. Acrylic polymers which are the materials of choice in preparing the biregional fibers of the invention are selected from one or more of the following: acrylonitrile based homopolymers, acrylonitrile based copolymers and acrylonitrile based terpolymers. The copolymers typically contain at least about 85 mole percent of acrylonitrile units and up to 15 mole percent of one or more monovinyl units that are copolymerizable with acrylonitrile including, for example, methacrylic acid esters and acrylic acid esters such as methyl methacrylate, ethyl methacrylate, propyl methacrylate, butyl methacrylate, methyl acrylate and ethyl acrylate; vinyl esters such as vinyl acetate and vinyl propionate; acrylic acid, methacrylic acid, maleic acid, itaconic acid and the salts thereof; vinylsulfonic acid and the salts thereof.

In accordance with a further embodiment of the invention, it is preferred to make the flexible biregional fiber of the invention from a sub-acrylic precursor polymer as described in copending application Ser. No. 08/280,708, which consists of a long chain polymer selected from the group consisting of copolymers and terpolymers containing less than 85 mole percent acrylic units but more than 15 mole percent of the above mentioned monovinyl units, copolymerized therewith. The amount of a plasticizer that can be present in a subacrylic polymer is preferably from greater than 15% to about 25% by weight. However, as much as 35 mole percent of the monovinyl units can be blended with the acrylic units to render the blend more easily melt extrudable through an extrusion nozzle or nozzles while the polymer blend is in a heat softened condition. The so extruded, heat softened filament can be stretched and attenuated, while under tension, to form a finer denier filament (i.e. in which the unit length of the fiber is increased with respect to the weight) having a relatively smaller diameter as compared to extruded fibers made from a standard acrylic resin. The sub-acrylic polymer of the invention can preferably be employed in extruding a filament having a noncircular cross-section.

The plasticizer can be any organic compound that can be added to or blended with a high polymer to facilitate processing and to increase the flexibility and toughness of the final product by internal modification (solvation) of the polymer molecule. Suitable plasticizers include, for example, vinyl chloride, methyl acrylate, methyl methacrylate, polyvinyl chloride and cellulose esters, phthalates, adipates, and sebacate esters, polyols such as ethylene glycol and its derivatives, tricresyl phosphate, caster oil, etc.

The physical shape of the polymeric fiber that can be suitably employed in the production of the oxidation stabilized or carbonized biregional fiber of the invention can be of the usual generally circular in cross section fiber, having an aspect ratio of greater than 100:1. By the term "generally circular in cross-section" it is meant that the diameter of the fiber can vary slightly in its circularity due to the fact that during extrusion of the fiber the hot melt extrudate has a tendency to flow until it is sufficiently cooled to set. Thus, the cross-section of the fiber is not generally in the shape of a perfect circle in cross section but may contain some slight variations in its circularity.

Preferably, the biregional fibers of the invention have a non-circular cross sectional shape as described in Modem Textiles, second edition, 1982, by D. S. Lyle, John Wiley & Sons. In the chapter entitled "Fiber Properties", pp. 41 to 63, various natural and polymeric fibers are described having different surface contours, i.e. smooth, rough, serrated, etc. which are said to influence cohesiveness, resiliency, loft, and thickness. Polymeric fibers having various non-circular cross-sectional shapes are described in Table 2–9 on pages 52 and 53 and include tubular, triangular, irregular, striated, oval, etc.

The non-circular in cross section biregional fiber of the invention can have a contour that is smooth or rough, regular or irregular in texture or shape. For example, the fiber can be tubular, flat, or provided with two or more longitudinally extending passageways. More preferably, the fiber is multi-lobal, e.g. trilobal, in cross-section and has a regular and symmetrical cross-sectional shape as well as a smooth surface contour. The fiber can also have a flat, dogbone, crescent, star, or the like, cross-sectional shape. Since a polymer is initially extruded in a hot molten condition through, for example, a tri-lobal die, it will continue to flow for a short duration until the polymer is cooled sufficiently to solidify, thus forming a generally tri-lobal, in cross section, fiber in which the individual lobes, however, are not necessarily perfectly symmetrical in shape. In the case of a fiber having a generally non-circular cross-section, the effective cross sectional diameter is the distance extending across a generally circular region where the core material of the fiber is solid and uninterrupted.

It is also contemplated and within the scope of the invention to coextrude two polymers of different compositions such that the core of the fiber is formed of one polymer, while the outer sheath of the fiber is formed of another polymer. The outer sheath of such a bipolymeric fiber can then be oxidatively stabilized and or carbonized in accordance with the procedure hereinbefore described. By way of example, the inner polymeric core material can be selected from any of a variety of polymers known in the art such as, for example, Kevlar™ polybenzimidazole (PBI), polycarbonate, polypropylene, ethyleneacrylic acid, polyester, polytetrafluoroethylene (PTFE), to provide the fiber with a desired physical characteristic, such as high strength, transparency, etc. A prerequisite for the manufacture of a bipolymer fiber is that the different polymers are compatible, have a similar melt index value and that they will adhere to each other at their contact surfaces. If the melt index values are dissimilar, an intermediate layer of a compatibilizing polymer can be coextruded between the inner core and the outer sheath polymers. The thus coextruded bipolymer fiber can then be oxidatively stabilized and heat treated to carbonize the outer sheath.

The invention also resides in a flexible biregional fiber that can be made more easily and at a substantially lower manufacturing cost from an unfiltered polymeric material such as, for example, an acrylic or sub-acrylic polymer that can contain from about 0.0001 to about 5% by weight particulate matter having a diameter of less than about 0.1 microns, preferably less than 0.001 microns. Sub-micron particles are naturally present in any polymeric material and thus will also be present in polymeric materials that are extruded to form fibers for use in the manufacture of textile articles, for example. These particles are generally organic or inorganic materials which are insoluble in the polymeric melt or dope. The term "unfiltered" used herein applies to polymeric materials which, when in a melt phase and during manufacture, are not subjected to the usual micro-filtration procedure to remove impurities, such as non-polymeric inclusions, from the polymeric material.

It is also contemplated and within the scope of the invention to introduce an additional quantity of sub-micron particulate matter, such as, for example, fumed silica, calcium oxide and various other inorganic materials such as silicates into the polymeric material. It has been found that the addition of from about 0.01 to about 2%, preferably from about 0.1 to about 1% of these sub-micron particles into the polymeric material will reduce the formation of a high degree of order or crystallinity in the spun fiber material. When the polymeric precursor fiber is subsequently heated and carbonized in a non-oxidizing atmosphere, it lacks the stiffness, brittleness and high modulus that is normally associated with a traditional carbon or graphitic fiber, while still exhibiting a low electrical resistivity and good uniform and contiguous surface structure, free from the voids, pores and pitting normally associated with adsorptive carbon materials. These characteristics differentiate the flexible biregional fiber of the invention from high surface area absorptive carbon materials.

The flexible biregional carbonaceous fiber of the invention is essentially continuous, i.e. it can be made to any desired length, it can be essentially linear or nonlinear (i.e. crimped in a conventional manner), and possess a high degree of flexibility which manifests itself in a fiber which has a much greater ability to withstand shear, which is not brittle, and which has a bending strain value of from greater than 0.01 to less than 50%, preferably from about 0.1 to about 30%. These properties allow the biregional carbonaceous fiber to be formed into a variety of assemblies or configurations for use in many different types of applications, such as batts, webs, etc. In contrast, the bending strain value of a conventional carbon or graphitic fiber with a high modulus is substantially less than 0.01% and often less than 0.001%. Moreover, the non-circular cross-sectional shape of a multiplicity of non-linear biregional carbonaceous fibers of the invention is particularly advantageous, e.g. especially in battings, since they are capable of forming a highly intertwined fibrous structure having a higher thermal R value at a given density compared to a batting containing fibers having a substantially round cross sectional shape. This is due mainly to surface interactions between the fibers and some enhanced Knudsen effects. In blended yarns, the non-circular cross section of a biregional fiber also exhibits greater flexibility and deflective recovery without breakage as compared to a conventional round cross-sectional fiber, principally due to the smaller apparent diameter of the non-circular shape of the fiber. Although the biregional fiber of the invention can have a diameter of as large as 30 microns, it is preferred to form the biregional fiber of a relatively small diameter of from about 1 to about 15 microns, preferably from about 4 to about 8 microns, since the diameter of the fiber is generally proportional to its surface area. Specifically, two fibers of a generally round or circular cross section and having a diameter of 5 microns will present about 4 times the surface area of a single fiber having a diameter of 10 microns.

Where the biregional fiber of the invention is intended for use as an electrode for a secondary energy storage device, the outer carbonized sheath of the biregional fiber preferably has a surface area of from greater than 1 to about 150 $m^2/g$, preferably greater than 5 $m^2/g$, and more preferably from about 10 to about 50 $m^2/g$, so long as the method employed to increase the surface area preserves the surface structural integrity of the fiber. The surface area of the non-circular biregional fiber is substantially higher compared to a circular fiber taught in the prior art that generally prefer a surface area that is less than one would associate with activated absorptive carbon (which has a surface area of from 50 to 2000 $m^2/g$). Activated absorptive carbon is known to have a very porous and pitted surface and one that is not essentially contiguous.

The reason for the use of biregional fibers of the invention having a contiguous surface and yet one that has a relatively high surface area lies in the fact that the cross-sectional geometry is changed from the typical generally circular cross-section of the prior art to the hereinbefore described non-circular cross-section which increases the surface area of the fiber for a given diameter while preserving the surface structural integrity characteristics.

With particular reference to FIG. 1, there is illustrated a biregional fiber of the invention having a generally circular cross-sectional shape. The fiber is generally identified by reference number 10 and comprises an inner core region 12 of a thermoplastic polymer and an outer region of a thermoset, stabilized sheath or a carbonaceous sheath. The fiber has a nominal cross-sectional diameter which is the linear distance from any one point along the outer surface of the fiber through the center of the fiber to an opposite point on its outer surface. Accordingly, the nominal diameter of a circular fiber is also its "effective" diameter.

With reference to FIG. 2, there is illustrated a biregional fiber, generally identified by reference number 20, having a generally tri-lobal cross-sectional shape which presents an enlarged surface area for a given outer nominal fiber diameter, as compared to the circular fiber of FIG. 1. The fiber has an inner core region 22 of a thermoplastic polymer and an outer oxidation stabilized or carbonaceous sheath represented by the shaded region 24. In the tri-lobal cross-sectional fiber, the outer nominal fiber radius is identified by the arrow Rn pointing to the outermost dotted line 26 encircling the fiber and extending generally tangential along the outer extent of the lobes of the carbonaceous sheath. The effective radius of the fiber is shown by the arrow Re pointing to the dotted line 28 which intersects the valleys of the tri-lobal fiber. The nominal radius of the core is identified by the arrow Cn pointing to the dotted line 30 which generally extends tangentially along the outer extent of the lobes of the core 22. Thus, in the case of a tri-lobal fiber the nominal diameter is equivalent to the nominal diameter of a generally circular cross-sectional fiber, but its effective diameter Re is substantially smaller as represented by the dotted line circle 28. Not only does the smaller effective diameter of the tri-lobal fiber provide the fiber with greater flexibility, but such flexibility is enhanced by the fact that the effective radius of the core is smaller than the nominal radius of the core and, in addition, the fact that the core is of a thermoplastic polymeric material having inherently greater flexibility as compared to a carbonaceous material. The enhanced flexibility of the biregional fiber is represented by a substantially reduced sensitivity of the fiber to shear although, as previously indicated, the shear sensitivity of the biregional fiber is influenced to a major extent by the ratio (r:R) and its bulk density, i.e. the shear sensitivity increases with an increase in the thickness of the outer carbonaceous sheath and its degree of carbonization or graphitization. The bending strain value of the biregional fiber is generally less than 50% which is advantageous in forming relatively sharp bends in the fiber without breakage of the fiber. Here again, the bending strain value is further enhanced by the fact that the fiber is non-circular and biregional in construction.

Optionally, the biregional carbonaceous fiber of the invention can also be provided with a central passageway extending along the length of the fiber core. A hollow or generally tubular fiber represents a saving in the amount of polymeric material used without any sacrifice in performance. Additionally, the interior passageway renders the fiber even more flexible. It will be understood that a tubular cross section bicomponent fiber would present concentric regions of a thermoset or carbonaceous outer region and a thermoplastic inner ring core.

It will be understood that the tri-lobal cross-sectional fiber configuration illustrated herein is representative of only one type of cross-sectional configuration and that the fiber can be made in any desired cross-sectional shape during its manufacture and that such shape is limited only by limitations of making an extrusion die for extrusion of a polymeric precursor material through the die, the composition of the polymer, temperature, etc. The number of lobes of a fiber is limited only by the fact that the heat softened polymer that is extruded from a die has a tendency to flow and thereby obliterate the cross-sectional shape to revert to a more nearly circular cross-sectional shape. For other cross-sectional shapes of polymeric fibers, reference is made to "Modem Textiles" by D. S. Lyle, particularly pages 52 and 53.

Preferably, the biregional fiber of the invention should have the following physical property criteria:

(1) A ratio (r:R) of the radius of the core region (r) with respect to the total radius of the fiber (R) of from about 1:4 to about 1:1.05, preferably from about 1:3 to about 1:1.12.

(2) A density of from about 1.20 to about 1.32 g/cm$^3$ for the oxidized biregional fiber, preferably from about 1.24 to about 1.28 g/cm$^3$. It should be understood, however, that the density of the fiber is dependent upon the ratio (r:R) of the radius of the core (r) with respect to the diameter of the fiber (R). If, for example, the ratio is 1:1.05 where the oxidized sheath occupies a very small portion of the cross sectional area of the fiber, the density of the fiber approaches that of a polymeric fiber. In the case where the polymeric fiber is derived from an acrylic polymer, the density is typically from about 1.15 to 1.19 g/cm$^3$ so that the density of the biregional fiber with a ratio of 1:1.05 is slightly higher.

The ratio of core volume to total volume of the biregional fibers has a substantial effect on the performance properties. Therefore, if ignition resistance is desired, then a ratio (r:R) of from 1: (1.05 to 1.2) gives acceptable performance, whereas for fireblocking performance a ratio of 1:1.12 to 1:1.4) is desirable.

(3) A density of, from about 1.45 g/cm$^3$ to about 1.85 g/cm$^3$, for the carbonized biregional fibers of the invention. Typical densities range from about 1.45 to 1.60 g/cm$^3$ for fibers in which the carbonaceous outer sheath is electrically non-conductive; from 1.60 to 1.70 g/cm$^3$ in which the carbonaceous sheath has electrostatic dissipating characteristics; from 1.65 to 1.85 g/cm$^3$ in which the carbonaceous sheath is electrically conductive, and up to about 1.87 g/cm$^3$ for the graphitic sheath of the biregional fiber which is highly conductive.

Typically, the densities of the carbonaceous biregional fibers of the invention can be somewhat higher than indicated above if, for example, the polymeric material that is used for making the biregional fibers is unfiltered and/or contain a high percentage of an added inorganic particulate material.

(4) A Young's modulus of from less than 1 MM psi (6.9 GPa), but greater than 0.3 MM psi, up to about 50 MM psi (345 GPa), typically up to 30 MM psi (207 GPa). A modulus of up to 50 MM psi being obtainable where the carbonaceous fiber sheath is predominant, i.e. at a ratio of about 1:4. 1,000,000 psi being equivalent to 1 MM psi.

(5) An aspect ratio of greater than 100:1 (the aspect ratio is defined herein as the length to diameter 1/d ratio of the flexible biregional fiber), and a carbonaceous fiber diameter of from about 1 to about 20 microns, preferably from 1 to 15 microns, and more preferably from about 4 to 8 microns.

(6) A carbonaceous surface area with respect to the biregional fiber of greater than 1 m$^2$/g and up to 150 cm$^2$/g, preferably greater than 5 m$^2$/g and, more preferably from about 10 to about 50 m$^2$/g. It will be understood the carbonaceous surface area of the biregional fiber can be as low as 0.1 m$^2$/g, but that such a low surface area will not provide the optimum in terms of the storage capacity or coulometric efficiency where the fiber is used for an electrode (7) The carbonized outer sheath of biregional fiber of the invention should have a carbon content of typically from greater than 68% and up to about 99% by weight. The carbon content of the fiber sheath is somewhat dependent on the type of polymeric precursor material that is used. Thus, if for example the polymeric precursor material contains as much as 2% of an inert particular material, the maximum carbon content must be less than 98%.

(8) Specific resistivities for the biregional carbonaceous fibers ranging from greater than $10^8$ ohm-cm for fibers that are electrically non-conductive, to less than $10^0$ ohm-cm for fibers that are electrically conductive, and to less than $10^{-2}$ ohm-cm for fibers that are highly conductive, i.e. graphitic.

(9) A bending strain value of from greater than 0.01% to less than 50%, preferably from 0.1 to less than 30%.

(10) In the case of graphitic fibers that are particularly useful for electrodes in secondary energy storage devices, it is preferred that the carbonaceous outer sheath has a contiguous surface that is substantially free of pits and pores and that has micropores representing less than 5% of the total surface area of the fiber.

With particular reference to FIG. 3, there is illustrated a flow chart that generally depicts a process for converting an acrylonitrile polymer into biregional fibers of the invention and into various end uses. The process conditions for spinning polymeric fibers of the compositions disclosed in the present application are generally known in the art. It is preferred that the polymer be selected from a standard acrylic or a sub-acrylic polymer as disclosed herein and that the fibers are non-circular in cross section. The polymeric fiber is then oxidatively stabilized in a stabilization chamber at a temperature of from about 150° to 300° C. in an oxidizing atmosphere. The time of oxidation for the fibers of the invention is, however, substantially reduced to less than 1 hour, preferably less than 30 min. The so produced biregional oxidation stabilized fiber (BROF) will exhibit distinct visually discernible regions of an inner core of a thermoplastic polymer and an outer region of an oxidized sheath.

The biregional stabilized precursor fiber is then subjected to a carbonization treatment at a higher temperature and in a non-oxidizing atmosphere such as is generally taught in the art. Reference being made here to "High Performance Fibers" by Battelle. The time of carbonization for the biregional precursor fibers of the invention is, however, substantially reduced from as much as 30 min., as taught in U.S. Pat. No. 4,837,076, to less than about 3 min., preferably from about 45 sec. to 3 min., depending on various factors such as diameter of the fibers, etc. and on the degree of carbonization desired. Prior to carbonization, the biregional precursor fibers can be crimped and then conducted through the carbonization furnace while in a relaxed and unstressed condition so that the fibers will retain their crimped configuration.

Biregional fibers having the physical properties of BRCF 1 or BRCF 2 fibers, as shown in Table I, can be converted into a wool like fluff or batting, for example, having high thermal insulation R values. These fibers can be employed as insulation for building structures, as stuffings for jackets or sleeping bags, and the like. BRCF 2 fibers can also be employed as electrostatic dissipating fibers for carpeting or for EMI shielding of sensitive electronic equipment, for example. Fibers having the properties of BRCF 3 and that are electrically conductive outer region can be suitably employed as fire retarding (FR) and sound dampening assemblies for use in various types of vehicles, such as aircraft, automobiles or ships.

Any of the BRCF 1, 2 and 3 fibers can be made into various different assemblies such as blends in which the biregional fibers are blended with other natural or polymeric fibers to form ignition resistant and fire retarding assemblies; composites in which the fibers are incorporated into a polymeric matrix to render the composites flame retarding and to increase the strength of the composite. The BRCF 3 fibers when compression formed with a binding agent are particularly suitable for use as a fire blocking sheet or panel. Any of these fibers or assemblies can also be provided with various coatings, including an organosilcone polymer that renders the fibers or assembly synergistically substantially more fire retarding, or a hydrophobic coating to render the assembly buoyant and or to reduce the water pickup.

The biregional graphitic fibers (BRGF) are particularly suitable for use as electrodes in secondary energy storage devices, such as ambient temperature, non-aqueous electrolyte batteries, or as an electrode, including bipolar electrodes, for use in lithium ion batteries. The various end use applications are more clearly illustrated in the flow chart of FIG. 3 and are discussed in greater detail hereinafter.

Preferred fibrous assemblies consisting of a multiplicity of the carbonaceous biregional fibers of the invention can be in the form of randomly entangled fibers in the form of a wool-like fluff, a generally planar non-woven sheet, web or batting, a compression formed panel, a woven or knitted fabric, or the like. Exemplary of a preferred fibrous assembly is a generally planar sheet like article, such as a batting, made from a multiplicity of individual, non-linear (i.e. crimped) biregional carbonaceous fibers. In a preferred method of fabrication of a batting a heavy tow of 320,000 (320K) polymeric fibers are employed. In the case of tows containing a smaller number of fibers, e.g. up to 40,000 fibers, the smaller tows can be fabricated into a knitted or woven cloth-like product. It is preferred to form the polymeric fibers, preferably in a stabilized condition, into the desired form (knit, woven, sheet or felt) prior to carbonization.

The non-linear, biregional carbonaceous fibers in the form of a non-woven web, felt or batt, and made from continuous or staple biregional precursor fibers are particularly suitable for use as thermal insulation. These fibers are preferably non-conductive, have a density of from about 1.45 to 1.60 g/cm$^3$, have a specific resistivity of from about $10^8$ to $10^2$ ohm-cm, a Young's modulus of less than 1 MM psi, an elongation to break of from about 4 to about 12%. These fibers are not shear sensitive when compared to fully carbonized, electrically non-conductive fibers of comparable density. Preferably, the non-linear biregional fibers have a non-circular cross sectional shape to provide a batt with greater flexibility and loft, as well as greater thermal insulative characteristics with higher R values. The non-circular cross sectional shape of the biregional fibers, especially in battings, produce higher thermal R values at given densities compared to batts containing round cross section fibers, mainly due to surface interactions and some enhanced Knudsen effects in the crevasses of the non-circular fibers.

Typical for the manufacture of thermal insulation assemblies from non-linear biregional fibers of the invention, are the procedures described in U.S. Pat. No. 4,868,037 and No. 4,898,783 issued to F. P. McCullough et al, the subject matter of which is incorporated herein by reference. The insulation assemblies utilizing the biregional fibers of the invention are resilient, shape reforming, lightweight and non-flammable, have a low heat conductivity, high thermal insulative characteristics, washability, low moisture retention, high loft and volume retention, and high cohesiveness.

The present invention further contemplates the manufacture of fire retarding and fire blocking assemblies in a manner similar to the general procedures described in U.S. Pat. No. 4,879,168, issued Nov. 7, 1989 to F. P. McCullough et al, the subject matter of which is incorporated herein by reference. Various terms such as "fire resistant" used herein relate to any one of the characteristics of flame arresting, flame retarding, fire shielding and fire barrier.

An article is considered to be flame retarding to the extent that once an igniting flame has ceased to contact unburned parts of a textile article, the article has the inherent ability to resist further propagation of the flame along its unburned portion, thereby stopping the internal burning process. Recognized tests to determine whether a textile article is flame retarding are, inter alia, the American Association of Textile Chemists and Colorists Test Method 34-1966 and the National Bureau of Standards Test described in DOC FF 3-71.

An article is considered to be "fire shielding" if it is capable of deflecting flames and the radiation therefrom in a similar manner as aluminum coated protective garments, which are known in the art.

Fire barriers have the capability of being non-flammable, flame retarding and providing thermal insulation characteristics.

In accordance with the general teachings of U.S. Pat. No. 4,879,168, at least 7.5% by weight of a multiplicity of non-linear, resilient, shape reforming, biregional carbonaceous fibers of the invention can be blended with natural or synthetic fibers. The resilient and shape reforming characteristics of the biregional carbonaceous fibers of the invention is, to some extent, dependent on the degree of carbonization and the ratio (r:R). For example, where the ratio indicates that the carbonaceous sheath represents a major portion of the fiber and that the degree of carbonization indicates that the outer sheath is graphitic and has a density of greater than 1.85 g/cm$^3$ and a bulk resistivity of less than 10$^{-2}$ ohm-cm, the resiliency of the fiber is, relatively speaking, of a lower degree than a fiber in which the carbonaceous outer sheath represents a minor portion or ratio (r:R) of the fiber and the degree of carbonization is low, i.e. where the outer sheath is electrically non-conductive.

The natural fibers can be selected from, for example, cotton, wool, flax, silk, or mixtures of one or more thereof with the biregional fibers of the invention. The polymeric fibers can be selected from, for example, cellulose, polyester, polyolefin, aramid, acrylic, fluoroplastic, polyvinyl alcohol and glass, or mixtures of one or more thereof with the biregional fibers of the invention. Preferably, the biregional carbonaceous fibers are present in the blend in an amount of from about 10% to 40%, are electrically non-conductive, antistatic or conductive, have a specific resistivity of from 10$^8$ to less than 10$^0$ ohm-cm, a density of from about 1.45 to 1.85 g/cm$^3$, and an elongatability of from 3 to 12%. These biregional fibers are not shear sensitive or, at most, are slightly shear sensitive, in comparison to fully carbonized fibers having a similar specific resistivity and which are shear sensitive. Greater amounts of the biregional carbonaceous fibers in the blends improves the fire blocking and fire shielding characteristics of the blend. However, it is desirable to maintain a fiber characteristic close to the conventional blends so as to have a desirable aesthetic appearance and feel.

The present invention further contemplates the manufacture of fire retarding and fire shielding assemblies in a manner similar to the general procedures described in U.S. Pat. No. 4,980,233, issued Dec. 5, 1990 and U.S. Pat. No. 4,997,716, issued Mar. 5, 1991, both to F. P. McCullough et al, the subject matter of which is incorporated herein by reference. According to such procedure, for example a panel or sheet formed from a polystyrene polymer, or a panel comprising a compression formed composite of a thermoplastic or thermosetting polymer and incorporating from about 10% to about 95% by weight, based on the total weight of the composite, a multiplicity of non-linear, resilient, shape reforming, biregional carbonaceous fibers of the invention can be provided. The biregional fibers can be concentrated on the surface of the panel in an amount of 10% or greater, or they can be distributed throughout the polymeric matrix in an amount of from preferably about 20% to about 75%. Optionally, the fibers can be applied to the surface as well as throughout the polymeric matrix. Flammability tests for the structure are conducted according to the Ohio State Burn Test and must meet the standard which is set forth in FAR 25.853. Advantageously, the biregional carbonaceous fibers of the invention for use in fire retarding and fire shielding assemblies can range from being electrically non-conductive to conductive having a specific resistivity of from 10$^8$ to less than 10$^0$ ohm-cm, a density of from about 1.45 to 1.85 g/cm$^3$, and an elongatability of from 3 to 12%. These fibers are not sensitive to shear when they are electrically non-conductive but gradually become more sensitive to shear as the degree of carbonization increases from non-conductive to conductive. However, in view of the fact that the biregional fibers of the invention always include a core of a thermoplastic polymer, the shear sensitivity will be substantially less for the biregional fibers as compared to the fully carbonized fibers of the prior art. Accordingly, the biregional fibers of the invention are slightly sensitive to shear as they become slightly conductive or conductive, but will become more so as the fibers become graphitic. Generally, low shear sensitivity produces less fiber breakage and hence provides for a greater population of longer fibers in all textile operations including the manufacture of non-woven assemblies such as battings, webbings, or the like. Low shear sensitivity becomes especially critical in the spinning of yarn from a fiber blend, in the manufacture of carpeting, woven fabrics, and the like. In the yarn spinning operation, there are several drafting operations which are high shear operations. Conventional carbonaceous fibers exhibit significant breakage of the fibers during these manufacturing operations unless the speed of operation of the manufacturing equipment is substantially reduced.

The present invention further resides in a means for synergistically improving the resistance to oxidation and thermal stability of the biregional carbonaceous fibers of the invention in accordance with the general procedures described in U.S. Pat. No. 5,024,877, issued Jun. 18, 1991 to F. P. McCullough et al, the subject matter of which is incorporated herein by reference. According to such procedure the biregional carbonaceous fibers of the invention are blended with from 0.5 to 90% by weight of an organosilicone polymer derived from the hydrolyzed partial condensation product of a compound selected from the group consisting of $R_xSi(OR')_{4-x}$ and $R_xSi(OOR')_{4-x}$, wherein R is an organic radical and R' is a lower alkyl or phenyl radical, and x is at least 1 and less than 4. Preferably, the organosilicone polymer is selected from the group consisting of trimethoxymethylsilane and trimethoxyphenylsilane. Biregional carbonaceous fibers of the invention, when coated with as little as 0.5% of the organosilicone polymer exhibit substantially improved fire retardancy. Composites in which the organosilicone polymer is present in an amount of as much as 90% by weight of the composite are useful in applications such as gaskets, for example.

In accordance with one embodiment, the invention is directed to a composite which comprises a synthetic resin, such as a thermoplastic or thermosetting resin, that is compressed together with a batting of the non-flammable biregional carbonaceous fibers of the invention. Prior to compression, the batting is treated with an organosilicone polymer in an amount to provide enhanced ignition resistance. Generally, there is utilized up to about 20%, preferably about 10% by weight of a polymerizable silicone resin. Such a composite will be useful, particularly in forming fire resistant or flame shielding structural panels, for use in vehicles and installations, particularly airplanes.

In another embodiment, from about 10 to 90%, preferably from about 20 to about 75% by weight of the biregional carbonaceous fibers can be used in combination with a synthetic resin in fabricating a composite. The synthetic resin used in the composites can be selected from any of the conventional type polymeric materials such as thermoplastic or thermosetting polymer. Composites with a higher loading of the biregional carbonaceous fibers are particularly useful in forming fire blocking structural panels, for use in vehicles and installations, particularly ships and airplanes.

Many composites and structures are possible and when prepared for a specific application will depend on the mechanical properties desired by the end-user. Generally, it has been found that fiber loadings of from about 10 to about 75% by weight are preferable for preparing flexible panels, in combination with the binder resins and/or organosilicone polymer or resin.

Buoyant, low density, open-celled fibrous assemblies having good thermal insulating properties are disclosed in U.S. Pat. No. 4,897,303, issued Jan. 30, 1990 to F. P. McCullough et al, the subject matter of which is incorporated herein by reference. The present invention further relates to such buoyant fibrous assemblies employing the biregional carbonaceous fibers of the invention. Particularly preferred are the non-circular biregional fibers that provide for a larger surface area and greater flexibility. A multiplicity of these fibers can form a batting or filling that has enhanced cohesiveness and in which the fibers form smaller interstitial spaces that provide the batting with improved buoyancy. In addition, the buoyant assembly is light weight and provides good thermal insulation, has a low water pick-up, and is flame retardant. In accordance with the procedure disclosed in U.S. Pat. No.4,897,303, the biregional carbonaceous fibers of the invention are coated with a water insoluble hydrophobic composition which can consist of any light weight, settable or curable composition that can be deposited as by spraying, dipping, and the like, so as to adhere to the fibers. Suitable compositions include high molecular weight waxes, haloaliphatic resins, thermoset and thermoplastic resins, ionomers, silicone products, polysiloxanes, and the like. Preferred coatings include polytetrafluoroethylene, polyvinylidene fluoride, polyvinyl chloride, etc. The buoyant assembly employing the biregional carbonaceous fibers of the invention are particularly useful in articles such as fillers for personal apparel, e.g. jackets, sleeping bags, floatation equipment, and the like.

The present invention also relates to biregional carbonaceous fibers that are electrically conductive for use as electrodes in secondary energy storage devices, esp. Batteries. Electrodes and storage devices are disclosed in copending application Ser. Nos. 08/280,708, filed Jul. 26, 1994 and 08/372,446, filed Jan. 13, 1995, in the name of F. P. McCullough et al, the subject matter of which is incorporated herein by reference. The biregional carbon or graphitic fibers of the invention have a density of from about 1.70 g/cm$^3$ to about 1.87 g/cm$^3$, a log specific resistivity of less than about $10^{-2}$ ohm-cm, a Young's modulus of from about 3 to about 30 million psi (20.7 to 207 Gpa), an elongatability of from about 2% to about 5%, and a bending strain value of from 0.1 to 30%. The biregional fibers of the invention have greater flexibility, as compared to commercially available electrically conductive carbon or graphite fibers that are carbonized throughout their cross section, in view of the presence of the inner thermoplastic core. The present invention also relates to different types of electrodes, including bipolar electrodes and pseudo bipolar electrodes, as particularly disclosed in the above referenced applications, employing the linear or nonlinear biregional carbonaceous fibers of the invention. The invention further contemplates employing the flexible biregional fiber electrodes of the invention in several different types of batteries including lithium ion batteries as particularly disclosed in application Ser. No. 08/372,446 in which a pseudo bipolar electrode, consisting of the biregional fibers of the invention, has a portion thereof coated with a lithium salt of a metal oxide.

In any one of the preceding applications and end uses for the biregional carbonaceous fibers of the invention, it will be understood that the fibers can be 1) linear, non-linear or a mixture of the linear and non-linear fibers; 2) the biregional carbonaceous fibers can be circular in cross-section, although they are preferably non-circular in cross section; 3) the polymeric material for making the biregional fibers can be selected from an acrylic or a sub-acrylic polymer; 4) the acrylic or sub-acrylic polymers can be filtered or unfiltered; 5) filler materials can be added to a thermoplastic polymer for making the biregional fibers, generally in the form of fine particles; 6) and the biregional carbonaceous fibers can be coated with a conformal silicone coating in any of the described applications and end uses in order to enhance their fire resistant characteristics.

EXAMPLE 1

A 40k tow of acrylic fibers containing approximately 94% acrylonitrile, 4% methacrylate and at least 0.01% of submicron impurities, which are not removed by microfiltration, is made by the traditional wet spinning technique. The acrylic fibers have an average diameter of 11 microns. The fiber tow is then oxidation stabilized in air while under tension at a temperature of 224° C. for 20 minutes. The density of the biregional precursor fiber is 1.25 g/cm$^3$. The fiber is cut and analyzed under a polarized light microscope and shows a clear separation, on visual inspection, between an oxidized outer sheath of the fiber and an inner non-oxidized thermoplastic core. The oxidized outer sheath of the fiber shows a distinct color change from the non-oxidized core, when viewed in cross section. The ratio of the radius of the core to the radius of the fiber is measured and determined to be 1:1.29

The stabilized precursor fibers are then texturized in a dynamic air stream and heat treated at a temperature of 550° C. in a tube furnace under a purged O$_2$ free N$_2$ atmosphere for 1.5 minutes while in a relaxed and unstressed condition. The resulting biregional carbonaceous fibers have an aspect ratio of greater than 10,000:1 and a nominal fiber diameter of 9.5 microns, the fibers are flexible and have a bending strain value of 0.1%, a density of 1.54 g/cm$^3$, a Young's modulus of 1 MM psi, a surface area of 3 m$^2$/g, and a bulk resistivity of $10^6$ ohm-cm.

EXAMPLE 2

Several samples of a 6k tow of fibers having a diameter of from 12 to 13 microns and of the same composition as in Example 1 were oxidation stabilized and then analyzed for density and ratio (r:R) of the core to the fiber. The analytical results of the tests are set forth in the table below:

TABLE II

| Sample | Time (min) | Temp (deg C.) | Density (g/cm³) | r:R; r = 1 and R = | Volume % core | Volume % sheath |
|---|---|---|---|---|---|---|
| A | 100 | 194 | 1.264 | 6.25 | 2.6 | 97.4 |
| B | 10 | 196 | 1.206 | 1.13 | 79.0 | 21.0 |
| C | 20 | 224 | 1.218 | 1.29 | 60.5 | 39.5 |
| D | 30 | 224 | 1.245 | 1.40 | 51.0 | 49.0 |

From the Table above, it can be seen that the density and the degree of oxidation of the fiber increases with residence time. Sample A is not an example of the invention since the volume percentage for the core was not sufficient to effectively distinguish the fiber from fully oxidized fibers. At a ratio of 1:6.25, the core represents only about 2.6% by volume of the total volume of the fiber which is insufficient to impart to the fiber the desired biregional characteristics. At a ratio of 1:4, the percent volume for the core increases to about 51% with a corresponding decrease in the density of the fiber. From the data in the table, it can also be deduced that an increase in residence time and temperature results in an increase in density. Samples B, C, and D, on visual inspection, clearly showed a difference in texture and color between the cores and the black oxidized outer sheath.

EXAMPLE 3

A tow of trilobal sub-acrylic fibers comprising 83% acrylonitrile, 14% vinyl chloride and 3% itaconic acid units is made by the traditional melt spinning technique and have a trilobal cross-section as shown in FIG. 2. The fibers are stretched during extrusion to attenuate the fibers and are then oxidatively stabilized in accordance with the procedure set forth in Example 1. The stabilized fibers are then carbonized at a temperature of 950° C. in a tube furnace under a purged $O_2$ free $N_2$ atmosphere for 1.5 minutes. The resulting fibers have a nominal fiber diameter of 8.0 microns, an effective fiber diameter of 4 microns, and an aspect ratio of greater than 10,000:1. The fibers are flexible and have a bending strain value of 0.2%, a surface area of 11 m²/g, a density of 1.7 g/cm³, a Young's modulus of 4 MM psi, and a bulk resistivity 0.085 ohm-cm. The ratio of the radius of the core to the radius of the fiber is measured and determined to be 1:1.5

EXAMPLE 4

A 40k tow of the biregional precursor fibers made according to the procedure of Example 1 is textured by a standard crimping mechanism and is passed onto a conveyor belt without applying any stress or strain on the crimped tow. The crimped tow is then passed through a heated furnace maintained at a temperature of 950° C. The furnace is constantly purged with nitrogen. The residence time in the furnace is 1.25 min. A tow of crimped carbonaceous biregional fibers is produced having a carbonaceous outer sheath and a thermoplastic inner core. The ratio of the radius of the core to the radius of the fiber is measured and determined to be 1:1.4. The density of the fiber is measured at 1.58 g/cm³. The fibers have a bulk resistivity of $10^6$ ohm-cm , an elongation of 8%, a pseudoelongation of 15% and a tenacity of 8 g/d. The crimped fiber tow is cut into various lengths of from about 6 to 7.5 cm and fed into a roller-top textile card. The fibers are separated by the carding treatment into a wool like fluff in which the fibers have a high degree of interlocking, as a result of the crimped configuration of the fibers, and a bulk density of 0.2 lb./ft³. The wool like fluff is suitable as a thermal insulating material for personal clothing articles such as Jackets, or the like, and has the same insulative effect as that of Goose or Duck down (feathers) at a rate of about one-third the weight of down as the insulating fill.

The fluff can be densified by needle punching in accordance with a procedure well known in the art. The fluff can also be treated with a thermoplastic binder such as a polyester, or the like, to form a mat or felt with enhanced cohesiveness and/or stiffness having good abrasion strength.

EXAMPLE 5

The non-flammability of the biregional carbonaceous fibers of the invention is determined following the test procedure set forth in 14 CFR 25.853(b), which is incorporated herewith by reference. The test is performed as follows:

A minimum of three 1"×6"×6" (2.54 cm×15.24 cm×15.24 cm) specimens (derived from a batting of the biregional carbonaceous fibers of Example 3 are prepared. The specimens are conditioned by maintaining them in a conditioning room maintained at a temperature of 70° C.±3° and 5% relative humidity for 24 hours preceding the test.

Each specimen is supported vertically and exposed to a Bunsen or Turill burner with a nominal I.D. tube of 1.5 inches (3.8 cm) in height. The minimum flame temperature is measured by a calibrated thermocouple pyrometer in the center of the flame and is 1550° F. The lower edge of the specimen is 0.75 inch (1.91 cm) above the top edge of the burner. The flame is applied to the cluster line of the lower edge of the specimens for 12 seconds and then removed.

Pursuant to the test, the material is self-extinguishing. The average burn length does not exceed 8 in. (20.32 cm), the average after flame does not exceed 15 seconds and flaming drippings did not continue to burn for more than 5 seconds after falling to the burn test cabinet floor.

EXAMPLE 6

A. Battings are made by blending an appropriate weight percent of each respective opened biregional carbonaceous non-conductive or antistat fibers in a blender/feed section of a sample size 12" Rando Webber Model B manufactured by Rando Machine Corp. of Macedon, N.Y. The battings produced typically are 1 inch (2.54 cm) thick and have bulk densities in a range of from 0.4 to 0.6 lb/ft³ (6.4 cm to 9.6 kg/m³). The battings are thermally bonded by passing the Rando batting on a conveyor belt through a thermal bonding oven at a temperature of about 120° to 150° C.

B. The battings from part A are immediately taken and formed into panels by compressing the opened fibers on a standard flat plate press at a pressure of 10,000 lb/ft² to form panels of ¼" thickness. Flammability tests are run according to the procedure of the Ohio State Burn test which is set forth in FAR 25.853. The results are shown in the following Table III with regard to the battings formed by the procedure of Part A:

TABLE III

| Sample No. | Sample Composition | Wt. % of each | Pass or Fail |
|---|---|---|---|
| 1 | BRCF/PEB/PE | 10/20/70 | passed |
| 2 | BRCF/PEB/PE | 20/20/60 | passed |

TABLE III-continued

| Sample No. | Sample Composition | Wt. % of each | Pass or Fail |
|---|---|---|---|
| 3 | BRCF/PEB/PE | 25/20/55 | passed |
| 4 | OPF/PEB/PE | 10/20/70 | failed |
| 5 | BRCF/PEB/Cotton | 10/10/80 | passed |
| 6 | Nomex ™ /PEB/PE | 20/20/60 | failed |
| 7 | Nomex ™ /PEB/PE | 50/20/30 | failed |
| 8 | OPF/PEB/Cotton | 50/15/35 | failed |
| 9 | BRCF/PEB/Wool | 10/15/75 | passed |

PEB = 8 denier KODEL ™ 410 polyester binder fiber
BRCF = Biregional carbonaceous fiber of Example 1
PE = 6 denier 2" staple DuPont DACRON ™ 164 polyester
Cotton = non-treated 1½" cotton staple
OPF = oxidized polyacrylonitrile fiber with a density of >40 g/cm$^3$
NOMEX ™ = DuPont m- aramid fiber

EXAMPLE 7

Following the procedure of Example 6 similar tests were performed on panels of ⅛" to 3/16" thickness prepared according to the results as shown in the following Table IV.

TABLE IV

| Sample No. | Sample Composition | wt. % of each | Pass or Fail |
|---|---|---|---|
| 1 | BRCF/PEB/PE | 30/20/51 | passed |
| 2 | BRCF/PEB/PE | 30/20/50 | passed |
| 3 | Nomex ™ /PEB/PE | 20/20/60 | failed |
| 4 | Nomex ™ /PEB/PE | 50/20/30 | failed |
| 5 | BRCF/PEB/PE | 20/20/60 | passed |

EXAMPLE 8

In accordance with the procedure described in U.S. Pat. No. 5,024,877, issued Jun. 8, 1991 to F. P. McCullough et al, the following experiment is conducted:

A. To produce a flexible panel a batting of the type described in Table III, Sample 3 is sprayed with a Dow Corning 1-2577 conformal coating (a hydrolyzed partial condensation of trimethoxy methyl silane) until 10% by weight of the coated batting comprises the coating. The coated batting is compressed on a platen between two vinyl sheets at 25 lb/sq. in. (1.75 Kg/cm$^2$) at a temperature of 260° F. (127° C.).

In lieu of the conformal coating, a silicone resin, which is polymerizable by either a heat condensation or a free radical condensation can be utilized.

EXAMPLE 8A

Ignition Resistance Test

The ignition resistance of the panels, utilizing the biregional carbonaceous fibers of the invention, is determined following the test procedure set forth in 14 CFR 25.853(b). The test performed as follows:

A minimum of three battings having a dimension of 2.5 cm×15 cm×30 cm and comprised of 80% the biregional carbonaceous fibers and 20% polyester are prepared. The battings are sprayed with a solution of Dow Corning 1-2577 conformal coating (a hydrolyzed partial condensation of trimethoxy methyl silane) which cures by contact with moisture in air. The sprayed battings are compressed at 25 lb/in$^2$ (1.75 Kg/cm$^2$) at a temperature of 260° F. (127° C.) to produce flexible panels. The coating is comprised of 10% by weight of the panels.

Standard vertical burn tests according to FAR 25.853b are conducted. The panels are conditioned by maintaining the specimens in a conditioning room maintained at a temperature of 21° C.±5° C. and 50%±5% relative humidity for 24 hours preceding the test. Each specimen is supported vertically and exposed to a Bunsen or Turill burner with a nominal I.D. tube adjusted to give a flame of 3.8 cm in height. The minimum flame temperature, measured by a calibrated thermocouple pyrometer in the center of the flame, is 843° C. The lower edge of the specimen is 1.9 cm above the top edge of the burner. The flame is applied to the center line of the lower edge of the specimens for 12 seconds and then removed.

The material is said to pass the test if the material is self-extinguishing, the average burn length does not exceed 20 cm, the average after-flame does not exceed 15 seconds, and there are no flame drippings. The material passed the test.

EXAMPLE 9

In accordance with the procedure described in U.S. Pat. No. 5,024,877, issued Jun. 18, 1991 to F. P. McCullough et al, the following experiment is conducted:

A multiplicity of biregional carbonaceous fibers of the invention as described in Example 3 in the form of a wool-like fluff is spread out and sprayed with an aerosol spray containing a fluoroalkane resin in a solvent comprising 1,1,1-trichloroethane sold under the trademark "SCOTCH-GARD" by Household Products Division of 3M. About 90% of the outside surface of the batting is coated. The fluff is then air dried to cure the coating and weighed. The fluff, when placed in water for two hours, floated. After two hours, the fluff is shaken, squeezed and weighed. Only about 0.1% water absorbency is detected. The coated fluff is suitable for use as a floatation aid and insulation for jackets, jumpsuits, and the like.

EXAMPLE 10

A) In accordance with the general procedure described in Example 1 of copending application Ser. No. 08/372,446, a tow of trilobal acrylic fibers containing approximately 86% acrylonitrile, 13% methacrylate and at least 0.01% of sub-micron impurities, which are not removed by micro-filtration, is extruded by the traditional melt spinning technique using a forming die with trilobally shaped extrusion orifices. The tow of acrylic fibers is stretched during extrusion of the fibers to attenuate the fibers and then oxidized in air for 25 min. in an oven in which the temperature is gradually increased from 250° C. to 300° C. The resulting precursor fibers are biregional and have an inner core of a thermoplastic polymer and an outer sheath of an oxidized, thermoset polymer. From polarized light photomicrographs, the two regions are visually distinguishable from each other.

B) The stabilized precursor fibers of A) are placed in a tube furnace and treated at a temperature of 1000° C. under a purged O$_2$ free N$_2$ atmosphere for 2.0 minutes. The resulting fibers have a nominal fiber diameter of 6.8 microns, an effective fiber diameter of 4.2 microns and an aspect ratio of greater than 10000:1. The fibers are flexible and have a bending strain value of 0.1%, a Young's modulus of 5 MM psi, a surface area of 14 m$^2$/g, and a bulk resistivity of 0.035 ohm-cm. The ratio of the radius of the core to the radius of the fiber is measured and determined to be 1:1.9 These fibers are useful as an electrode material for secondary batteries and as the conductive component for very light weight, thin, flexible measurement electrodes for a portable EKG monitor.

C) The biregional carbonized fibers of B) are placed in a high temperature tube furnace and treated at a temperature of 1750° C. under a purged $O_2$ free $N_2$ atmosphere for 1–2 minutes. The resulting biregional graphitized fibers have a nominal fiber diameter of 6.4 microns, an effective fiber diameter of 4.0 microns and an aspect ratio of greater than 10,000:1. The fibers are flexible, have a bending strain value of 0.1%, a Young's modulus of 18 MM psi, a surface area of 12 $m^2/g$, and a bulk resistivity of 0.0035 ohm-cm. The ratio of the radius of the core to the radius of the fiber is measured and determined to be 1:2. These fibers are useful as an electrode material for secondary batteries and as the conductive component for very light weight, thin, flexible measurement electrodes for a portable EKG monitor.

What is claimed is:

1. An ignition resistant or fire blocking composite comprising a multiplicity of biregional carbonaceous fibers with a thermoplastic or thermoset polymer, wherein each said biregional carbonaceous fiber comprises an inner region of a thermoplastic polymeric core and an outer region of a carbonaceous sheath, and wherein said biregional fibers are present in the composite in an amount of from 10 to 95% by weight, based on the total weight of the composite.

2. The composite of claim 1, wherein the inner thermoplastic core region and the outer carbonaceous sheath region of said biregional fibers are continuous and do not present an intermediate boundary or discontinuity between the regions.

3. The composite of claim 1, wherein said multiplicity of biregional carbonaceous fibers are in the form of a yarn, tow, a wool like fluff, batt, mat, web or felt, a compression formed sheet, screen, or panel, a knitted or woven cloth or fabric.

4. The composite of claim 3, wherein said thermoplastic or thermoset polymer is in the form of a sheet or panel and said multiplicity of biregional carbonaceous fibers are concentrated on the surface of the sheet or panel in an amount of 10% or greater.

5. The composite of claim 3, wherein said thermoplastic or thermoset polymer is in the form of a sheet or panel and said multiplicity of biregional carbonaceous fibers are distributed throughout the polymeric matrix of the sheet or panel in an amount of from about 20 to 75%.

6. The composite of claim 3, wherein said multiplicity of biregional carbonaceous fibers are treated with up to 20% of a polymerizable silicone resin prior to formation of the compression formed composite panel.

* * * * *